United States Patent [19]
Turner

[11] 3,797,210
[45] Mar. 19, 1974

[54] MOWERS
[75] Inventor: Anthony Leonard Turner, Alcester, England
[73] Assignee: Turner Engineering Company (Coughton) Limited, Coughton, near Alcester, Warwick, England
[22] Filed: June 13, 1972
[21] Appl. No.: 262,283

[52] U.S. Cl.................. 56/15.8, 56/15.6, 56/16.2
[51] Int. Cl............................................ A01d 35/00
[58] Field of Search......... 56/6, 7, 11.9, 12.6, 14.9, 56/15.6, 15.7, 15.8, 16.2

[56] References Cited
UNITED STATES PATENTS
2,827,746  3/1958  Bouillant-Linet................ 56/15.8 X
3,646,733  3/1972  Clapsaddle, Jr. ............... 56/16.2 X
2,976,663  3/1961  Smith et al...................... 56/15.8 X
3,127,940  4/1964  Hutchinson et al............. 56/15.8 X
3,641,748  2/1972  Vose............................... 56/16.2 X Primary Examiner—Louis G. Mancene
Assistant Examiner—J. A. Oliff
Attorney, Agent, or Firm—Marshall & Yeasting

[57] ABSTRACT

An elongate shaft extends fore-and-aft of a tractor having a bearing for mounting one end of the shaft on the tractor. A first power-driven means is used for rotating such end of the shaft to adjust the angular position of the shaft. A laterally extending arm is fixed to the other end of the shaft, and a mower is povoted to the outer end of the arm. A second power-driven means is used for adjusting the angular position of the mower relative to the arm. The angular position of the shaft and the angular position of the mower are fixed after adjustment by the two power-driven means, and variations in the position of the mower relative to the tractor, to follow undulations of the ground, are accommodated solely by deflection of the shaft.

6 Claims, 5 Drawing Figures

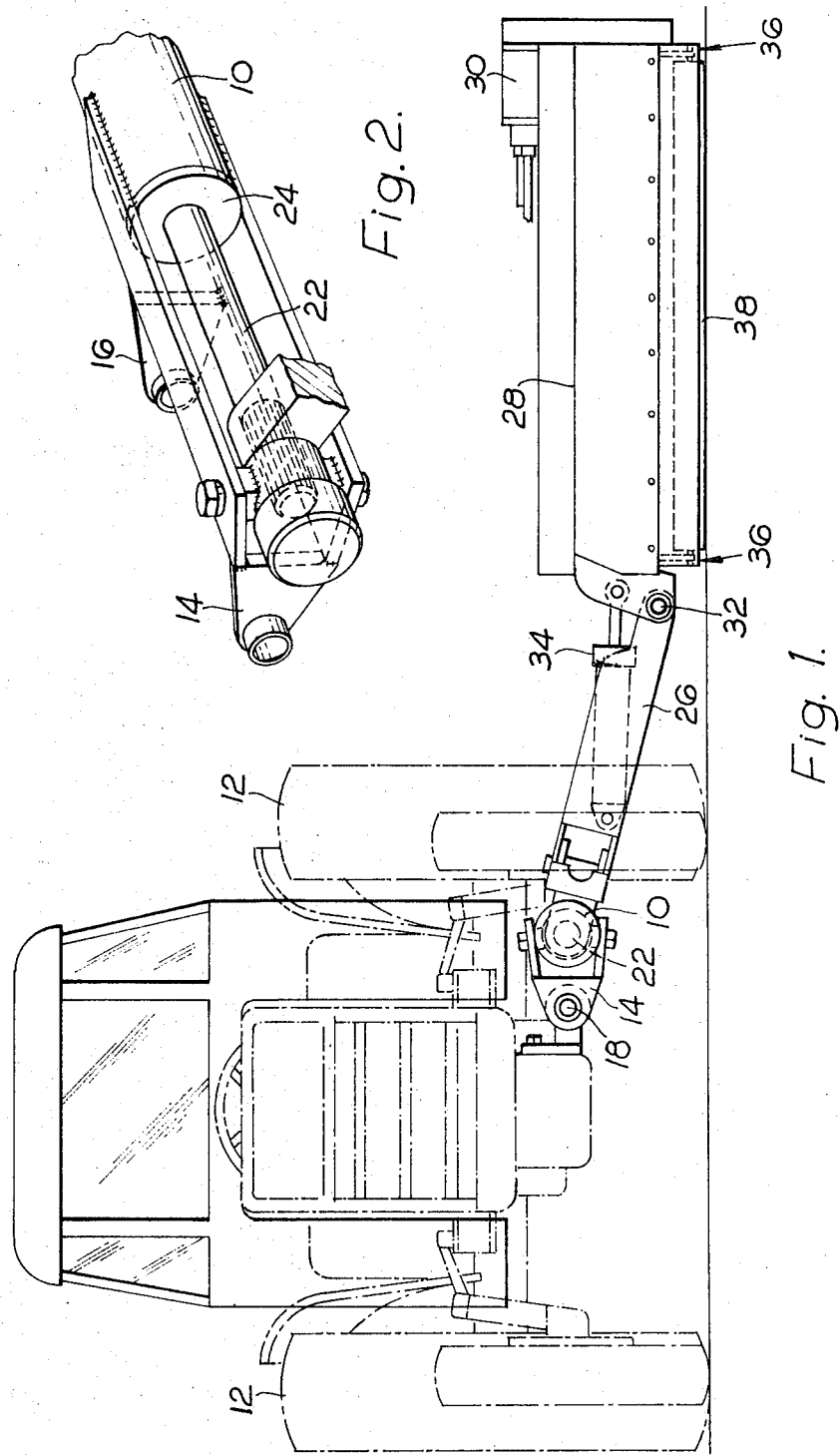

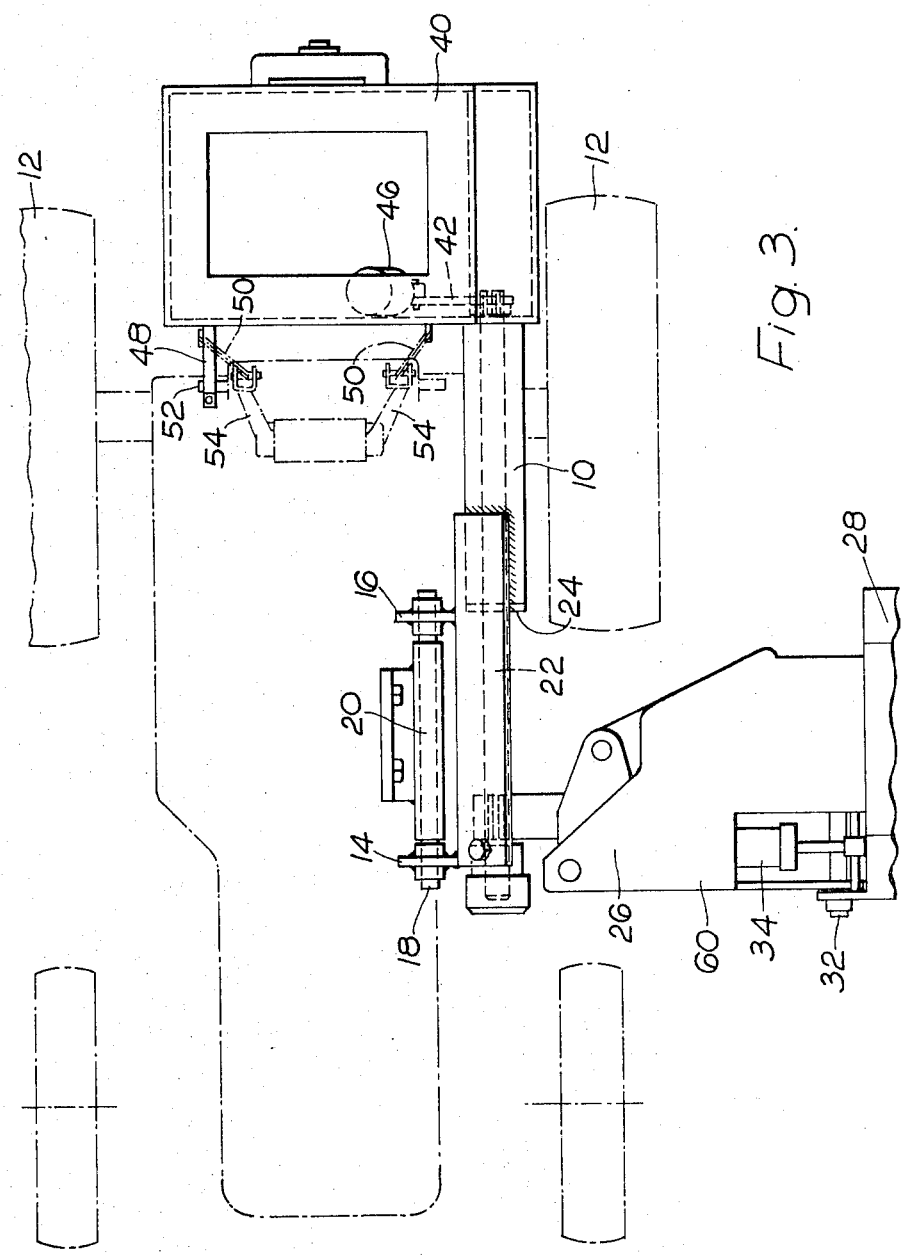

MOWERS

BACKGROUND OF THE INVENTION

This invention relates to mowers of the kind used for example, for cutting road-side vegetation including hedges. Mowers of the kind referred to are mounted laterally of a tractor, so that the tractor may be driven along a road, whilst the mowing continues, and comprise a cutting head mounted on one or more arms, and with hydraulic cylinders for varying the angle of the head relative to the arms and tractor so that the driver may be operating a number of controls cause the head to follow the verge contours closely. However, the driver must also control the tractor, and a considerable degree of operator's skill is required if the vegetation is to be closely cut and the driver is to achieve satisfactory output in a working day.

SUMMARY OF THE INVENTION

The objects of the present invention are to provide improvements whereby control of the mower is simplified.

In accordance with the present invention a mower of the kind referred to is characterised in that the position of one arm relative to the tractor is controlled by resilient suspension means.

By these means, the mower may be lowered into contact with a ground surface, the hydraulic system (or like means) placed in a neutral condition allowing free movement of the head, and the head allowed to follow the ground contours of itself. Thus, the driver may largely concentrate on driving the tractor, and need give less attention to the mower head.

Preferably the said one arm is supported, relative to the tractor, on a torsion bar, and the torsion bar may be angularly adjustable about its longitudinal axis, and moreover extend fore and aft of the tractor, so that by such angular adjustment the position of the arm is varied, and hence the height of the mower head relative to the tractor is varied.

The torsion bar may be turned by a hydraulic ram coupled to a crank fast with the torsion bar, or alternatively, instead of providing a torsion bar, a relatively massive and rigid shaft may be used, carrying the arm at one end, journalled for rotation, and coupled to a hydraulic ram for example at the other end for turning the shaft (as in the case of the torsion bar), and the ram may be provided with a spring mounting, so that the shaft is normally held in one particular angular position but may turn about its longitudinal axis against the spring, as a suspension means. In the case where a torsion bar is used, the suspension effect is due to the bar twisting along its length, or due to it deflecting upwardly and downwardly about the crank coupled end, and in either case the end adjacent the arm may be mounted on the tractor in a journal or on a pivot to allow the turning of the bar or shaft or the deflection of the bar whilst the mounting takes a proportion of at least the static load.

BRIEF DESCRIPTION OF THE DRAWINGS

FIG. 1 is a front elevation of a tractor (shown in chain-dot lines) and fitted with the mower unit;

FIG. 2 is a fragmentary perspective view showing the front coupling between mower and tractor;

FIG. 3 is a fragmentary plan view of the whole;

DESCRIPTION OF THE PREFERRED EMBODIMENTS

Figure 4:
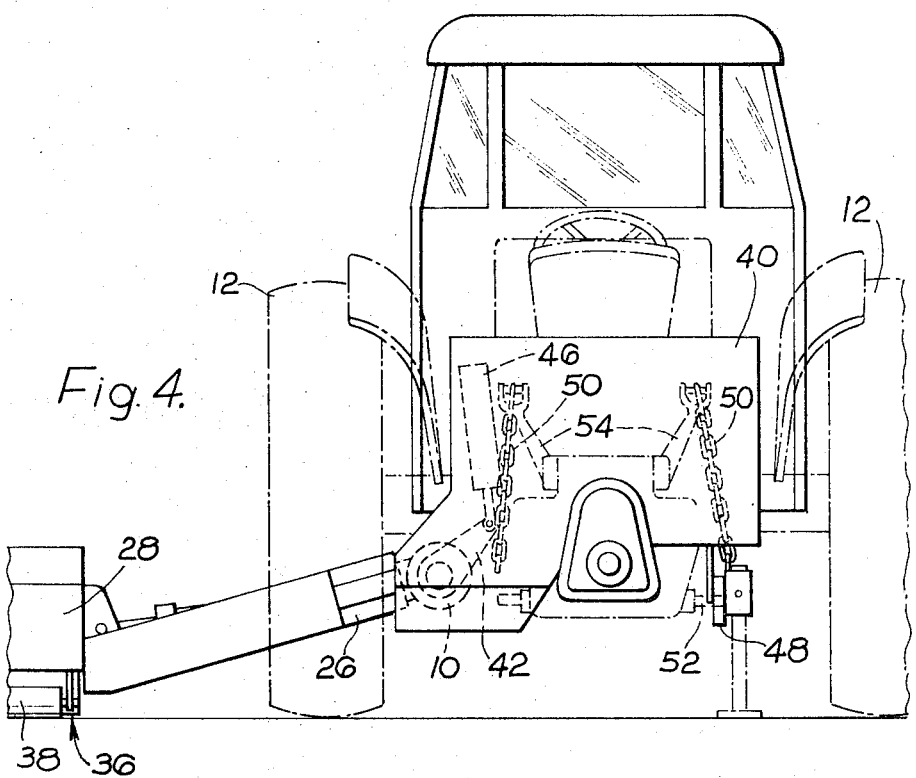
FIG. 4 is a fragmentary rear elevation.
Figure 5:
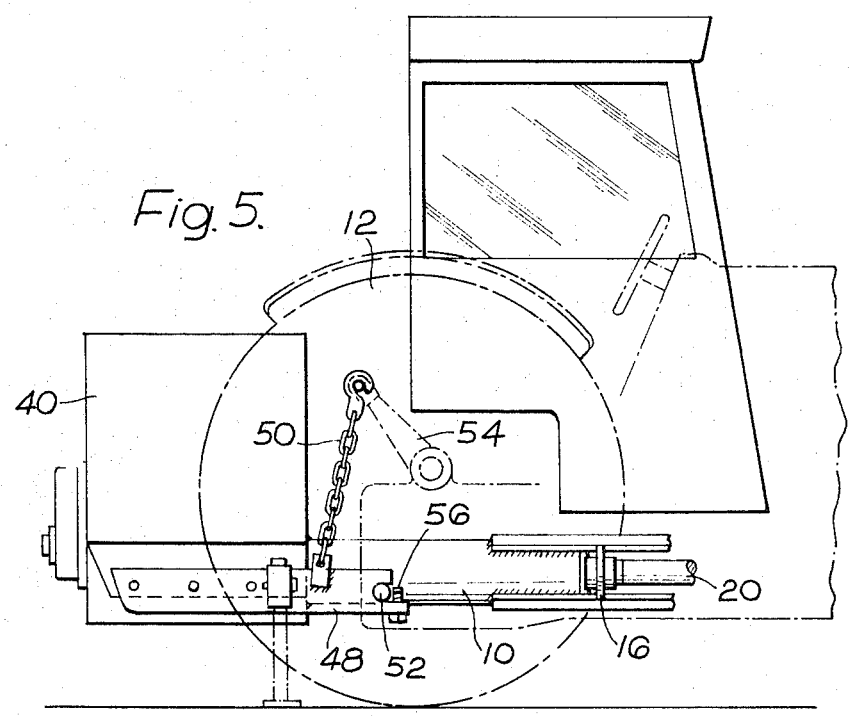
FIG. 5 is a fragmentary elevation showing a rear coupling.

Referring now to the drawings, a relatively large diameter tube 10 is provided for extending from the region of the rear wheels 12 of the tractor to a mid-point along the length thereof, the tube (when mounted on the tractor, extending below the body of the tractor). The front end of the tube, see FIG. 2, is provided with a pair of lugs 14, 16, and is coupled to the tractor by a pin 18 extending through those lugs 20 already provided on the tractor. This provides a mounting for the tube so that it may swing to take its axis in an arc about the axis of the pin.

The tube houses a torsion bar 22 which extends along the length of the tube and projects beyond the front end of the tube, through a journal bearing and oil seal 24 in the end of the tube. The torsion bar is splined at its end and carries a first arm 26 which extends laterally of the tractor and away from the tractor. The arm thus extends radially and is adapted to swing about the axis of the tube and hence the torsion bar so that its free end remote from the tractor moves in an arc having upward or downward components.

A mower head comprises an elongated casing 28 open at its lower side journalling a shaft (not shown) extending along the length of the casing, and the shaft carrying sets of flail blades (alternatively the mower could use other cutting means e.g. a rotary device, a cylinder or sickle bar.) The shaft is driven by a hydraulic motor 30 located for example at one end of the casing which is most remote from the tractor. The opposite end of the casing is journalled on a cross pin 32 to the free end of the arm 26, and a hydraulic ram 34 extends between the arm and the casing, so that in lengthening or shortening of the ram by suitable application of hydraulic pressure, the casing and hence the complete mower head are swung about the axis of the cross pin. Hence by suitable positioning of the arm and the casing, the mower may operate upon a level surface which is higher or lower than the road upon which the tractor rests, or upon a surface inclined upwardly or downwardly away from the road.

Ends of the casing are provided with ground engaging skids 36, and the casing is also provided with a trailing roller 38 for ground engagement.

The rear of the tube 10 is fast with a tank structure 40 carried at the rear of the tractor. The tube may open into the tank, which forms a reservoir for hydraulic fluid, so that the tube itself forms an extension of the tank and an extension of the reservoir and the surface area of the tube may provide a useful additional cooling effect for the hydraulic fluid or the tube may be remote from the tank. The torsion bar is journalled in the tank, and at its rear end is fast, for example by means of splines, with a radially extending crank arm 42, see FIG. 4, which is pinned to one end of the ram of a hydraulic cylinder 46 extending upwardly in the tank. Application of hydraulic fluid to one or other end of this ram turns the crank and hence turns the torsion bar so as to swing the arm 26 in the manner mentioned. The tank carries a gear box (not shown) which is provided with a connection point for coupling to the power-take-off shaft (also not shown) of the tractor, so as to drive a pump within the tank, and hydraulic controls for the mower driving motor and for the rams may also be located in the tank so that they are all enclosed and shielded from dirt. The controls may be connected to hand-operated levers located near the driver.

The tank is provided with a pair of bifurcated lugs 48 extending forwardly of the tank, and with a chain or pair of chains 50.

Tractors of the kind used for these mowing purposes are usually provided with hydraulically operated lift arms at the rear, these comprising a pair of arms journalled near the rear-axle centre and the arms may be removed leaving short pins 52 on which the bifurcated ends may engage. The chains may be engaged with the top arms 54 provided above the arms referred to, so that by raising those arms, the complete tank unit is lifted into the position for use. A bolt, cotter pin or the like 56 may be inserted through the free end of each of the bifurcated portions to secure them to the pins.

The arm which is fast with the forward end of the torsion bar may be provided with ramp portions 60 which, when in the position for use extend fore and aft. The unit of tank and associated parts together with tube and arm and mower head may be laid flat upon the ground and the tractor reversed so that one rear wheel rides up one of the ramps 60, across the arm and down the other of the ramps until in the approximately correct position for engagement. The tank is coupled to the lift arms of the tractor by the method explained hereinbefore, the front end of the tube may then be coupled to the tractor by means of the single pin.

When the mower is connected to the tractor, the tank ram may be extended (or contracted as the case may be) to swing the arm upwardly as far as possible, and the arm to head ram may be contacted (or expanded as the case may be) to swing the mower head to a near vertical position parallel to the side of the tractor, for convenience in movement of the tractor to a position for use. In the position for use the arm and mower head are lowered until the mower head is resting upon for example a grass verge to be mown, and the hydraulic ram movement necessary for this may be continued so that the mower head rests firmly on the ground and is supported by the trailing roller and the skids. The tractor is then driven along the road parallel to the verge whilst the head motor is driven to rotate the shaft and mow the verge. In the event of any variation in the contour of the ground the mower unit may rise or fall, accompanied by deflections in the torsion bar, accommodated in part by the pivotal connection provided at the front end of the tube. It is found that variations of the order of several inches or even one foot (depending upon the design parameters) above and below a mean position may be accommodated by these means. This simplifies use and enables the driver to concentrate more on driving the tractor, giving less attention to repositioning of the mower head.

The foregoing description relates to a mower provided with a single arm located between the mower head and the tractor. Similar principles may be applied to an arrangement having two arms located between the mower unit and the tractor, in which case one ram will control the position of the second arm relative to the first arm, and a second ram the position of the mower head relative to the second arm. In this event however the range of loads applied to the torsion bar may vary by such a magnitude, depending upon whether the two arms are substantially co-linear or are parallel, that additional torsional or otherwise suspension means may be required.

One possibility is to provide a torque tube located within the main tube and fast with the free end of the latter, extending towards the tank structure, the torsion bar itself passing through the two tubes. The torsion bar is then provided with a radial lug or lugs, and the torsion tube likewise, so that when the torsion bar is turned by the ram from the vertical position towards a position in which the first arm extends substantially horizontally, then the lugs engage, and a downwards movement of the free end of the first arm (that is the end remote from the tractor) will result in torsional load being taken via the tube as well as by the shaft.

Alternatively, a rotational damper may be located parallel to the shaft and adjacent the first arm, and have a radially extending lever together with a roller abutment, arranged so that when the first arm is moved from for example a near vertical position towards a near horizontal position it encounters the radial lever and turns the latter, meeting resistance from the damper, so that the latter shares torsional loads.

Another arrangement which is possible within the scope of the invention is to utilise a construction generally similar to that illustrated but to locate the hydraulic ram for varying the arm position along the length of the arms, i.e., at the forward end of the torsion bar or tube instead of at the rearward end of the same. This may be preferred when the arms have a long reach and the torsion bar or tube then continues to serve in transferring load to the rear axle of the tractor and possibly also as a resilient means controlling the cutting head in any adjusted position, although other means may be provided for the latter purpose.

I claim:

1. A mower assembly mounted on a tractor, comprising an elongate shaft extending fore-and-aft of the tractor, a bearing for mounting one end of the shaft on the tractor, first power-driven means for rotating such end of the shaft to adjust the angular position of the shaft, a laterally extending arm fixed to the other end of the shaft, and a mower pivoted to the outer end of the arm, wherein the improvement comprises second power-driven means for adjusting the angular position of the mower relative to the arm, the angular position of the shaft and the angular position of the mower being fixed after adjustment by the two power-driven means, and variations in the position of the mower relative to the tractor, to follow undulations of the ground, being accommodated solely by deflection of the shaft.

2. A mower assembly according to claim 1 wherein the shaft is free to deflect as a cantilever as well as in torsion.

3. A mower assembly according to claim 2 wherein a generally horizontal arm has one end pivotally secured to the shaft adjacent to the first arm, and has its other end pivoted to the tractor by a removable pin, to guide the cantilever deflections of the shaft.

4. A mower assembly according to claim 3 wherein a tube which surrounds and rotatably supports the shaft has said generally horizontal arm fixed to one end, and has its other end fixed relative to the tractor.

5. A mower assembly according to claim 1 wherein the mower is driven by a hydraulic motor and both power-driven means are operated by hydraulic rams.

6. A mower assembly according to claim 5 wherein the mower assembly comprises a self-contained hydraulic system and is adapted to be elevated by lift arms of the tractor into a position where it is releasably attached to the tractor.

* * * * *